United States Patent
Qiao et al.

(10) Patent No.: US 10,760,551 B2
(45) Date of Patent: Sep. 1, 2020

(54) COMPUTER STORAGE MEDIUM, COMPUTER PROGRAM PRODUCT, METHOD FOR MONITORING FAULT OF WIND POWER GENERATOR SET, AND DEVICE

(71) Applicant: BEIJING GOLDWIND SCIENCE & CREATION WINDPOWER EQUIPMENT CO., LTD., Beijing (CN)

(72) Inventors: Zhiqiang Qiao, Beijing (CN); Xinan Tang, Beijing (CN); Kang Li, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 393 days.

(21) Appl. No.: 15/567,809

(22) PCT Filed: Nov. 10, 2016

(86) PCT No.: PCT/CN2016/105310
§ 371 (c)(1),
(2) Date: Oct. 19, 2017

(87) PCT Pub. No.: WO2017/113998
PCT Pub. Date: Jul. 6, 2017

(65) Prior Publication Data
US 2018/0119677 A1     May 3, 2018

(30) Foreign Application Priority Data
Dec. 31, 2015 (CN) .......................... 2015 1 1032667

(51) Int. Cl.
*F03D 7/02* (2006.01)
*F03D 17/00* (2016.01)
(Continued)

(52) U.S. Cl.
CPC ............. *F03D 17/00* (2016.05); *F01D 15/10* (2013.01); *G01M 13/00* (2013.01); *G01M 15/00* (2013.01);
(Continued)

(58) Field of Classification Search
CPC ........ F03D 7/0292; F03D 7/028; F03D 7/048; G06F 17/5009; G06F 17/5018;
(Continued)

(56) References Cited

U.S. PATENT DOCUMENTS 6,750,776 B2    6/2004    Tonomura
8,853,877 B1 *   10/2014    Zalar ....................... F03D 7/048
                                                                  290/44
(Continued)

FOREIGN PATENT DOCUMENTS

CN      101299004 A     11/2008
CN      101872165 A     10/2010
(Continued)

OTHER PUBLICATIONS

International Search Report dated Feb. 13, 2017; PCT/CN2016/105310.
(Continued)

*Primary Examiner* — Kandasamy Thangavelu

(57) ABSTRACT

A method and device for monitoring a fault of a wind power generator set. The method includes the following steps: performing (101) fault identification on a component in a wind power generator set; and presenting (102) an identified fault using a three-dimensional model of the component. The device includes corresponding identifying module (61)

(Continued)

and presenting module (62). By using the method and device, the fault monitor can intuitively observe the fault existed in the component, which not only is beneficial for taking effective fault processing measures before a minor fault evolves into a serious fault and thus reduces the harm of the fault, but also reduces the experience requirements for the fault monitor and avoids the process that the fault monitor in the prior art analyzes a two-dimensional curve to identify whether there is a fault in the component according to his experience.

7 Claims, 5 Drawing Sheets

(51) Int. Cl.
G01M 13/00 (2019.01)
G01M 15/00 (2006.01)
F01D 15/10 (2006.01)

(52) U.S. Cl.
CPC ....... F05B 2250/20 (2013.01); F05B 2260/84 (2013.01)

(58) Field of Classification Search
CPC ............ G05B 23/0221; G05B 23/0283; G05B 23/024; B64C 11/44; H02K 7/025
See application file for complete search history.

(56) References Cited

U.S. PATENT DOCUMENTS

| | | | |
|---|---|---|---|
| 2009/0099832 A1* | 4/2009 | Nasle | G06F 17/5009 703/18 |
| 2009/0217101 A1* | 8/2009 | Becker | G05B 23/0283 714/39 |
| 2010/0332272 A1* | 12/2010 | Ong | F03D 7/0292 705/7.36 |
| 2011/0313726 A1* | 12/2011 | Parthasarathy | G05B 23/024 702/179 |
| 2012/0010864 A1* | 1/2012 | Taber, Jr. | G06F 17/5018 703/9 |
| 2013/0035798 A1* | 2/2013 | Zhou | F03D 7/0292 700/287 |
| 2015/0115608 A1* | 4/2015 | Draper | F03D 7/028 290/44 |
| 2016/0079826 A1* | 3/2016 | Paiz | H02K 7/025 318/161 |
| 2016/0154406 A1* | 6/2016 | Im | G05B 23/0221 702/188 |
| 2016/0236790 A1* | 8/2016 | Knapp | B64C 11/44 |

FOREIGN PATENT DOCUMENTS

| | | |
|---|---|---|
| CN | 101907088 A | 12/2010 |
| CN | 102033984 A | 4/2011 |
| CN | 102175449 A | 9/2011 |
| CN | 1102799619 A | 11/2012 |
| CN | 102809660 A | 12/2012 |
| CN | 102854015 A | 1/2013 |
| CN | 102980612 A | 3/2013 |
| CN | 103471841 A | 12/2013 |
| CN | 102799619 B | 12/2014 |
| CN | 104392020 A | 3/2015 |
| CN | 104459388 A | 3/2015 |
| CN | 104614179 A | 5/2015 |
| CN | 104697767 A | 6/2015 |
| CN | 104865269 A | 8/2015 |
| CN | 105510038 A | 4/2016 |
| EP | 2 851 561 A1 | 3/2015 |
| KR | 101355888 B1 | 1/2014 |

OTHER PUBLICATIONS

Extended European Search Report dated Dec. 12, 2018; Appln. No, 16880789.9.

* cited by examiner

US 10,760,551 B2

COMPUTER STORAGE MEDIUM, COMPUTER PROGRAM PRODUCT, METHOD FOR MONITORING FAULT OF WIND POWER GENERATOR SET, AND DEVICE

CROSS-REFERENCE TO RELATED APPLICATIONS

This application is a national stage of International Application No. PCT/CN2016/105310, filed on Nov. 10, 2016, which claims priority to Chinese Patent Application No. 201511032667.0, filed on Dec. 31, 2015. Both of the aforementioned applications are hereby incorporated by reference in their entireties.

TECHNICAL FIELD

The present application relates to monitoring technologies and, in particular to a computer storage medium, a computer program product, a method for monitoring a fault of a wind power generator set, and a device.

BACKGROUND

With the rapid development of wind power generation, a wind power generator set has gained wide application. However, during the application of the wind power generator set, it is inevitable that some faults will occur. How to effectively monitor the fault and thus ensure the normal operation of the wind power generator set become urgent problems to be solved.

With respect to the fault monitoring of the wind power generator set, in the present, it is often only possible to provide a two-dimensional curve obtained after the measurement of a component in the wind power generator set. The fault of the component reflected by the two-dimensional curve is not intuitionistic enough, and an experienced fault monitor is often required to analyze the two-dimensional curve to identify whether there is a fault in the component according to his experience.

SUMMARY

In order to achieve the above object, embodiments of the present application employ the following technical solutions:

In a first aspect, there is provided a method for monitoring a fault of a wind power generator set, which includes:
performing fault identification on a component in the wind power generator set; and
presenting an indentified fault using a three-dimensional model of the component.

In a second aspect, there is provided a device for monitoring a fault of a wind power generator set, which includes:
an identifying module, configured to perform fault identification on a component in the wind power generator set; and
a presenting module, configured to present an indentified fault using a three-dimensional model of the component.

In a third aspect, there is provided a computer storage medium including:
a computer program stored in the computer storage medium, the computer program causes a computer to perform the above-mentioned method for monitoring the fault of the wind power generator set.

In a fourth aspect, there is provided a computer program product including:
a computer program that is stored on a computer readable storage medium, the program causes a computer to perform the above-mentioned method for monitoring the fault of the wind power generator set.

DETAILED DESCRIPTION

Some implementations of the present application will now be described in detail with reference to the accompanying drawings. In the case of non-collision, the following embodiments and the features thereof may be combined with each other.

Figure 1:
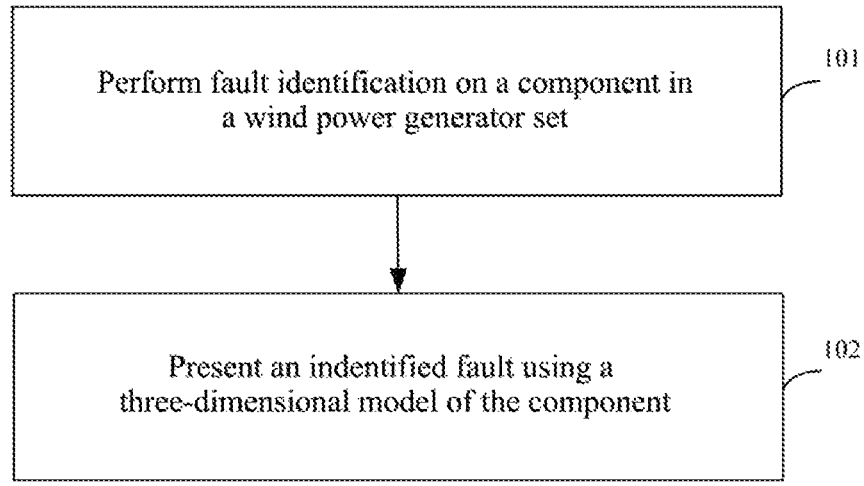
FIG. 1 is a schematic flowchart of a method for monitoring a fault of a wind power generator set provided in an embodiment of the present application.

FIG. 1 is a schematic flowchart of a method for monitoring a fault of a wind power generator set provided in an embodiment of the present application. As shown in FIG. 1, the method includes:

Step 101: performing fault identification on a component in the wind power generator set.

In some embodiments, vibration, sound, temperature and imaging sensors are first installed on the component of the wind power generator set, and these sensors are used to collect a set of sensor data of the component. The set of sensor data may include a vibration parameter, a sound parameter, a temperature parameter and an image parameter. The set of sensor data collected by the sensors is sent to an industrial personal computer through a programmable logic controller (PLC), and is further uploaded to an Amazon Web Services (AWS) cloud through the industrial personal computer, where the AWS is a cloud service platform, so that the set of sensor data is analyzed and processed in the AWS cloud to determine whether there is a fault in the component corresponding to the set of sensor data.

For example, during the collection of the set of these sensor data, the method used may include, but is not limited to, the following three collecting methods:

The first collecting method: the vibration sensor, sound sensor, temperature sensor and imaging sensor are used respectively, so that the sound, vibration, temperature and image parameters are independently collected, respectively.

The second collecting method: sound and vibration are collected using the same sensor, and inference is performed on the collected signal based on the function relationship between the sound and the vibration to obtain the values of the sound parameter and the vibration parameter, respectively.

The third collecting method: sound and temperature are collected using the same sensor, and inference is performed on the collected signal based on the function relationship between the sound and the temperature to obtain the values of the sound parameter and the temperature parameter, respectively.

The collection of the imaging parameter can be realized by video recording, or by means of a three-dimensional modeling technology. The signals collected by the vibration sensor, the sound sensor, the temperature sensor, etc, are processed to obtain a reproduced image data which is taken as the value of the image parameter.

Analyzing and processing the set of sensor data in the AWS cloud may include using a pre-trained machine learning model to process the set of sensor data to obtain a characteristic testing matrix. Where a row vector of the characteristic testing matrix is used to indicate the component, and a column vector thereof is used to indicate a physical parameter. And, the fault identification is then performed according to the characteristic testing matrix.

In some embodiments, the machine learning model can be a back propagation (BP) neural network. The vibration, sound, temperature and/or image parameters of each component collected by the sensors are taken as the input parameters of the BP neural network, and the BP neural network performs principal component analysis, correlation analysis and/or clustering analysis to obtain the characteristic testing matrix. If values of the physical parameters of the component in the characteristic testing matrix match with values of physical parameters in a design state, it is determined that the component is operating normally; otherwise, it is identified that there is a fault in the component.

Once a fault in the component has been identified, a target fault mode matching with the values of the physical parameters of the component in the characteristic testing matrix can be queried in a fault database.

In step 101, the AWS cloud can be used to analyze and process the set of sensor data of the component collected by the sensors to determine whether there is a fault in the component corresponding to the signal due to the fact that the physical parameters of the component deduced by the set of sensor data can accurately describe the operation state of the component. The wind power generator set is a large system consisting of multiple sub-systems, each of which is made up of multiple mechanical components, which are fitted together by following a certain standard. The standard is specified in advance according to the functional data and the geometric data of the component. Therefore, the components can be described using the functional data and the geometric data, and the set consisting of the functional data and the geometric data is the physical parameters of the component. The physical parameters include but are not limited to: rotation shaft torque T, inherent frequency H, frictional force $F_f$, reflective light intensity U, power W transmitted by a shaft, output power P, rotational speed N, pressure $F_p$, wind speed V, an impeller diameter D, mass M of the component and/or a pixel O. Where the rotation shaft torque T, the frictional force $F_f$ and the pressure $F_p$ belong to mechanical parameters.

Step 102: presenting the indentified fault by using a three-dimensional model of the component.

In some embodiments, with respect to the indentified component with a fault, a mechanical parameter is extracted from the physical parameters of the component with the fault, the value of the mechanical parameter of the component with the fault is determined according to the characteristic testing matrix and taken as a boundary condition, and stress analysis is performed on a normal-state three-dimensional model of the component with the fault, which represents a normal state of this component, to obtain a three-dimensional model presenting a stress state.

In some embodiments, a target three-dimensional model corresponding to the target fault mode obtained by the fault identification in step 101 is invoked from a pool of the three-dimensional model of the component, and the target three-dimensional model is presented.

Wherein, the pool of the three-dimensional model of the component is used to store the three-dimensional model in the normal state, and may further store the three-dimensional model under each fault mode.

When there are multiple components, the pool of the three-dimensional model of the component may store the three-dimensional model of a respective component under various fault modes, and the three-dimensional model in the normal state thereof.

In some embodiments, the three-dimensional model of respective component can be determined in the pool of the three-dimensional model of the component according to the values of the physical parameters in the characteristic testing matrix obtained in the previous step.

In some embodiments, the three-dimensional model of respective component can be directly determined according to the component indicated by a row vector of the characteristic testing matrix.

The three-dimensional model of respective component can be determined in the pool of the three-dimensional model of the component according to the values of the physical parameters in the characteristic testing matrix due to the fact that there are some relatively stable physical parameters, such as geometric parameters and material parameters, in the component, and the component corresponding to the three-dimensional model can thus be identified according to these relatively stable physical parameters.

In some embodiments, the inherent frequency of an object is a physical characteristic of the object, and is determined by the characteristics of structure, size, shape and material and the like of the object. Therefore, the inherent frequency can be calculated according to the value of the vibration parameter obtained by the test, and thus the physical parameters of structure, size, shape and material and the like of the component can be calculated. The calculation formula for the inherent frequency is shown as follows:

$$H = 2\pi\sqrt{\frac{M}{K}}$$

Where M is the mass, K is the stiffness coefficient, and the stiffness coefficient can be calculated by the following formula:

$$K = P_f/\delta$$

Where $P_f$ is the force, $\delta$ is the deformation quantity. In the case that the force $P_f$ and deformation quantity $\delta$ are known, the mass M of the component is worked out by the above two formulas simultaneous, and the mass M is a function of the density and the geometry size, namely:

$$M = f(\rho, v)$$

Where ρ is the density, v is the volume. Therefore, the density ρ, the volume v of the three-dimensional model recorded by each three-dimensional model set, combining with the stiffness coefficient K, are preliminarily matched with the characteristic testing matrix, so that the three-dimensional model of the matching component is invoked. If there are multiple matching results, a most matching three-dimensional model can further be determined according to the parameters related to the operation state and the geometry, for example torque T, cross-section moment of inertia IR, cross-section torsional angular variation $d_\varphi$, length variation $d_x$, surface integral micro-element dA, power W transmitted by the shaft, the rotational speed N of the shaft, the radius R of the shaft, the shear force $\tau_R$ at the radius R, the shear $\gamma_R$ at the radius R, the torsional stiffness G and the anti-torsional cross-section coefficient $W_R$. The relationships between these parameters are as follows:

$$T = 9549 \frac{W}{N}$$

$$\gamma_R = R \frac{d\varphi}{dx}$$

$$\tau = G\gamma$$

$$\tau_R = G\gamma_R = GR \frac{d\varphi}{dx}$$

$$T = \int_A R\tau_R dA = G \frac{d\varphi}{dx} \int_A R^2 dA$$

$$\frac{d\varphi}{dx} = \frac{T}{GI_R}$$

$$\tau_R = \frac{T \cdot R}{I_R}$$

$$W_R = \frac{I_R}{R}$$

In some embodiments, a position sensor, such as a GPS sensor, for collecting a position parameter can be added to the component, and the corresponding relationship between the three-dimensional model and the position parameter can be established in advance, so that the corresponding three-dimensional model can be determined according to the collected position of the component.

The three-dimensional model in the normal state stored in the pool of the three-dimensional model of the component can be obtained in advance by three-dimensional modeling according to design values of the physical parameters of the component. First, the design values of the parameters of W,T,N,M,K,G,$W_R$,H,O for each component are known, a material coefficient $x_m$, a geometric coefficient $x_g$ and a functional coefficients $x_f$ are calculated according to a mapping function of $f: X(W,T,N,M,K,G,W_R,H,O) \rightarrow Y(x_m, x_g, x_f)$. Then, the material coefficient $x_m$ the geometric coefficient $x_g$ and the functional coefficients $x_f$ are substituted into a function of $f_{3D} = f(x_m, x_g, x_f)$ to perform the three-dimensional modeling, so as to obtain the three-dimensional model.

In some embodiments, after performing the fault identification on the component in the wind power generator set, with respect to the identified fault, the fault is presented using the three-dimensional model of the component, so that the fault monitor might intuitively observe the fault existed in the component, which not only is beneficial for taking effective fault processing measures before a minor fault evolves into a serious fault and thus reduces the harm of the fault, but also reduces the experience requirements for the fault monitor and avoids the process that the fault monitor in the prior art analyzes the two-dimensional curve to identify whether there is a fault in the component according to his experience.

Figure 2:
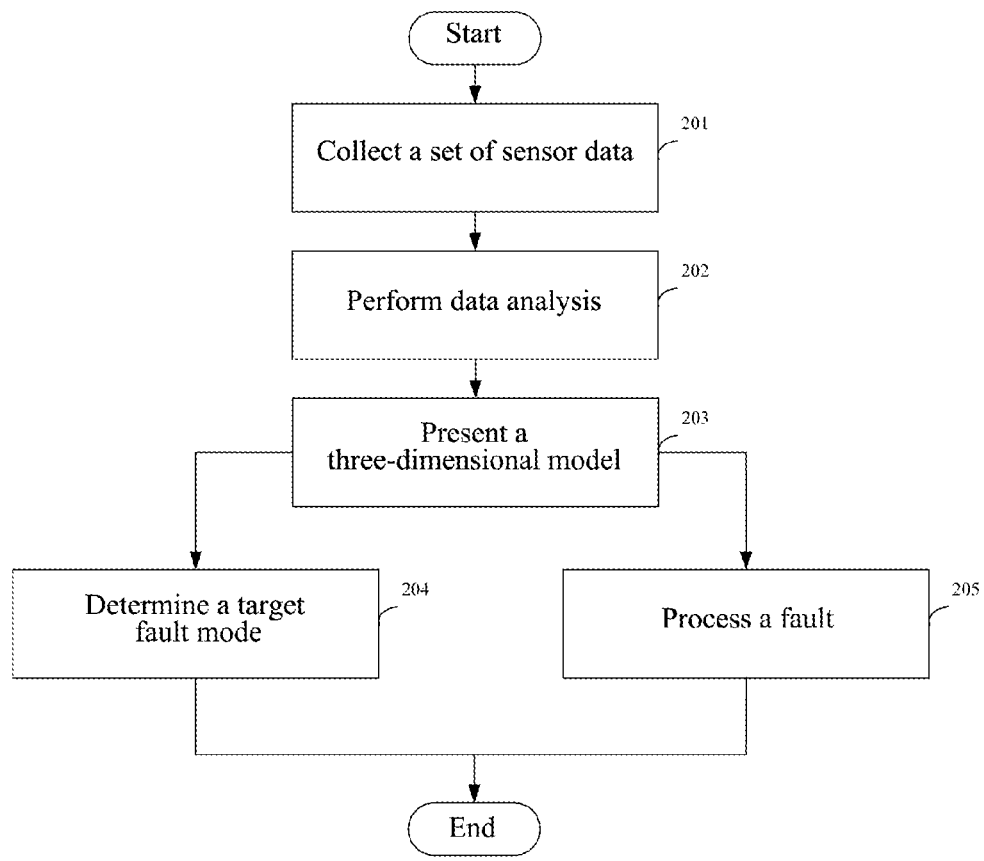
FIG. 2 is a schematic flowchart of a method for monitoring a fault of a wind power generator set provided in an embodiment of the present application.

FIG. 2 is a schematic flowchart of a method for monitoring a fault of a wind power generator set provided in an embodiment of the present application. The method for monitoring the fault of the present embodiment may direct to all components in the wind power generator set, or may only direct to a component in one or more sub-systems in the wind power generator set, which is not limited in this embodiment. As shown in FIG. 2, the method includes:

Step 201: sensors collect a set of sensor data of a component and upload the collected sensor data to an AWS cloud via a PLC controller and an industrial personal computer successively.

Where the set of sensor data includes, but is not limited to, vibration, sound, temperature, and image parameters.

Step 202: the AWS cloud performs data analysis according to the set of sensor data.

Figure 3:
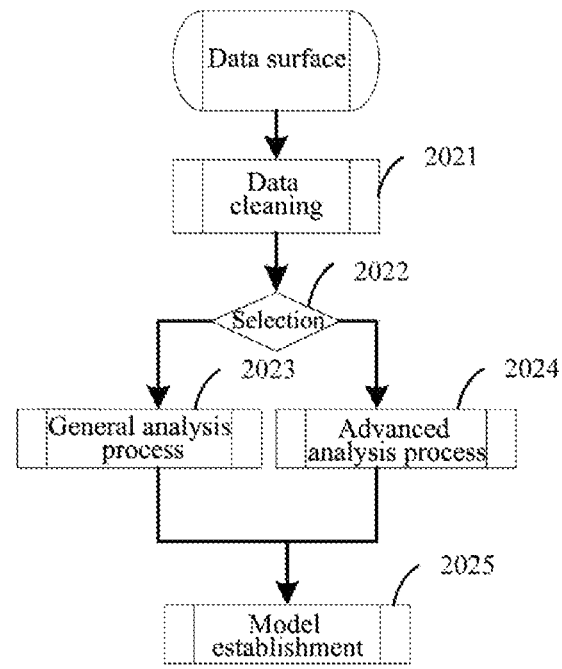
FIG. 3 is a flowchart of data analysis of an AWS cloud.

In some embodiments, the AWS cloud performs the data analysis according to the set of sensor data to identify a fault existed in the component. FIG. 3 is a flowchart of data analysis of an AWS cloud. As shown in FIG. 3, the data analysis process includes:

Step 2021: the AWS cloud performs a data cleaning operation after receiving the set of sensor data through a data interface.

Step 2022: select to perform a general analysis process or an advanced analysis process.

In some embodiments, threshold ranges of the vibration, sound, temperature and image parameters for each component are set in advance. When any one of the parameters in the set of sensor data exceeds a corresponding threshold range, the advanced analysis process is performed to perform more accurate and detailed fault analysis. Otherwise, the general analysis is performed.

In some embodiments, performing the general analysis process or the advanced analysis process can be selected according to a user's setting. Where the processing speed of the general analysis process is relatively fast, but the accuracy thereof is slightly low, while the processing speed of the advanced analysis process is relatively slow, but the accuracy thereof is relatively high.

Step 2023: performing the general analysis process.

Figure 4:
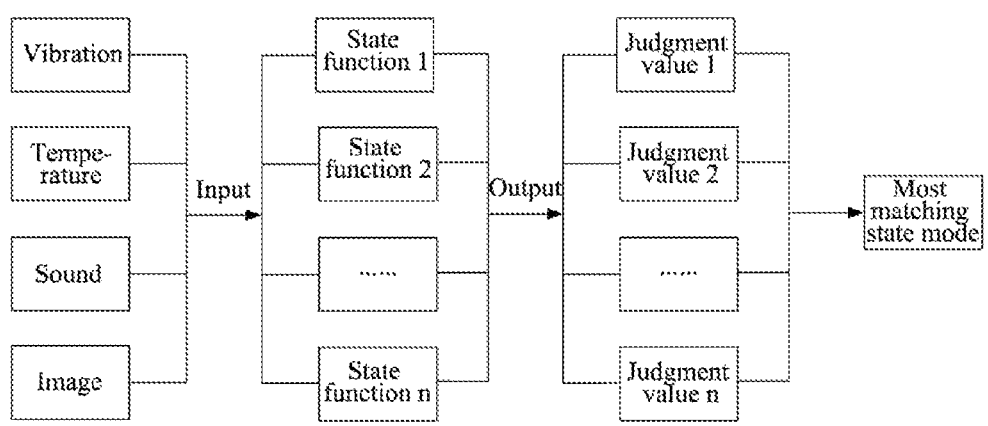
FIG. 4 is a flowchart of general analysis.

FIG. 4 is a flowchart of general analysis. As shown in FIG. 4, the vibration, sound, temperature and image parameters of the component can be input into state functions corresponding to different state modes, such as state function 1 to state function n, n is the number of states. Each state function outputs a judgment value, and then analysis is performed according to the judgment values of the respective state functions, so that a most matching state mode is determined from various state modes. If the matching state mode is a normal state mode, the component does not have a fault and is operating normally. Otherwise, it is determined that there is fault in the component.

Step 2024: performing the advanced analysis process.

In some embodiments, the vibration, sound, temperature and image parameters of the component are input into a BP neural network for performing principal component analysis, correlation analysis and/or clustering analysis, so as to obtain a characteristic testing matrix.

Where a parameter vector of the characteristic testing matrix is $$X = \begin{bmatrix} x_1 \\ x_2 \\ \vdots \\ x_{11} \\ x_{12} \end{bmatrix} = (x_1, x_2 \ldots, x_{11}, x_{12})^T$$

$x_1$ to $x_{12}$ represent 12 characteristic parameters, each of which corresponds to a physical parameter, the corresponding relationship is as follows:

$x_1=T, x_2=H, x_3=F_f, x_4=U, x_5=W, x_6=P, x_7=N, x_8=F_p,$
$x_9=V, x_{10}=D, x_{11}=M, x_{12}=O.$

If the total number of components included in the wind power generator set is N', then a 12×N' characteristic testing matrix can be established:

| Physical parameters | Components $X_1\ X_2\ \ldots\ X_j\ \ldots\ X_n$ |
|---|---|
| $X_1$ | $X_{11}\ X_{12}\ \ldots\ X_{1j}\ \ldots\ X_{1n}$ |
| $X_2$ | $X_{21}\ X_{22}\ \ldots\ X_{2j}\ \ldots\ X_{2n}$ |
| $\vdots$ | $\vdots\quad\vdots\qquad\vdots\qquad\vdots$ |
| $X_i$ | $X_{i1}\ X_{i2}\ \ldots\ X_{ij}\ \ldots\ X_{in}$ |
| $\vdots$ | $\vdots\quad\vdots\qquad\vdots\qquad\vdots$ |
| $X_m$ | $X_{m1}\ X_{m2}\ \ldots\ X_{mj}\ \ldots\ X_{mn}$ |

Where m=12 represents 12 characteristic parameters, each of which corresponds to a physical parameter mentioned above, and n=N' indicates N' components of the wind power generator set.

If values of the physical parameters of the component in the characteristic testing matrix match with values of physical parameters in a design state, it is determined that the component is operating normally. Otherwise, it is determined that there is a fault in the component.

Step 2025: establishing a component model according to an analysis result.

In some embodiments, the analysis result is primarily used to establish the component model, which is characterized by data, and these data may be the values of the characteristic testing matrix obtained in step 2024 or values of the state functions in step 2023.

Step 203: the AWS cloud presents a three-dimensional model of the component.

In some embodiments, according to the 12×N' characteristic testing matrix calculated by inputting the vibration, sound, temperature and image parameters into the BP neural network, a mechanical parameter is extracted from the physical parameters of the component with the fault, and the value of the mechanical parameter of the component with the fault is determined. Then the value of the mechanical parameter is taken as a boundary condition, and stress analysis is performed on a normal-state three-dimensional model of the component with the fault, which represents a normal state of this component, to obtain a three-dimensional model presenting a stress state.

Step 204: if it is determined that there is a fault, the AWS cloud matches the analysis result with a fault database to determine a target fault mode of the component.

Figure 5:
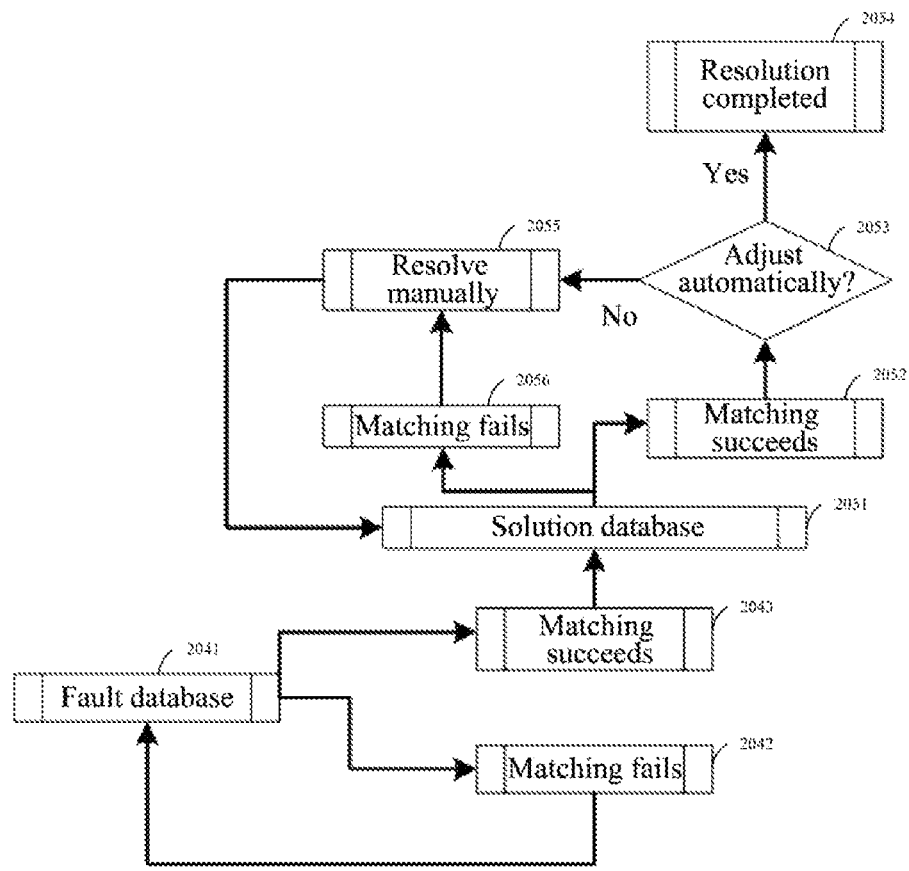
FIG. 5 is a flowchart of fault matching and processing.

FIG. 5 is a flowchart of fault matching and processing. As shown in FIG. 5, the fault matching and processing process includes:

Step 2041: matching the analysis result with the fault database.

If the advanced analysis process is performed in the previous step, the target fault mode matching with the values of the physical parameters of the component in the characteristic testing matrix may be queried in the fault database. The value ranges of the physical parameters of the component in the characteristic testing matrix under each fault mode are recorded in the fault database, and the target fault mode of the component is judged according to the value ranges.

Or, if the general analysis process is performed in the previous step, the corresponding target fault mode is determined according to the most matching state mode determined by analysis.

Step 2042: if there is no matching target fault mode in the fault database, the matching fails. And then, a fault mode may be added in the fault database, and the characteristic testing matrix and/or the set of sensor data corresponding to the component with the fault are stored in the corresponding position of the newly added fault mode.

Step 2043: if there is a matching target fault mode in the fault database, the matching succeeds.

Step 205: processing the fault.

As shown in FIG. 5, the fault is processed by invoking a solution database, which includes:

Step 2051: querying in the solution database to obtain a solution corresponding to the target fault mode of the component.

The solution database records the relevant solution of the fault that has already happened.

Step 2052: if the solution is found by querying, the matching succeeds.

Step 2053: if the matching succeeds, determine whether the solution can be executed, so as to eliminate the fault existed in the component.

Step 2054: if yes, execute the solution.

Step 2055: otherwise, output the solution, so as to resolve manually.

Step 2056: if no solution is found, the matching fails.

In some embodiments, if there is no solution corresponding to the target fault mode in the solution database, the target fault mode is determined as a new fault. The technical personnel is required to further analyze the new fault, for example, judging the fault reason and formulating a solution according to the relevant data of the component, such as the set of sensor data and/or the characteristic testing matrix, and to adding the solution into the solution database.

In some embodiments, after performing the fault identification on the component in the wind power generator set, with respect to the identified fault, the fault is presented using the three-dimensional model of the component, so that the fault monitor might intuitively observe the fault existed in the component, which not only is beneficial for taking effective fault processing measures before a minor fault evolves into a serious fault and thus reduces the harm of the fault, but also reduces the experience requirements for the fault monitor and avoids the process that the fault monitor in the prior art analyzes the two-dimensional curve to identify whether there is a fault in the component according to his experience. In addition, because the BP neural network is used to identify the fault according to the physical parameters of each component in the design state, the accuracy of the fault identification is improved, and it is achieved that the relevant data of the component is stored into the fault database when there is a new fault, in order to continuously improve the fault database.

Figure 6:
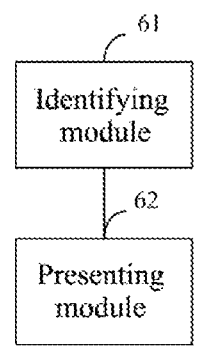
FIG. 6 is a schematic structural diagram of a device for monitoring a fault of a wind power generator set provided in an embodiment of the present application.

FIG. 6 is a schematic structural diagram of a device for monitoring a fault of a wind power generator set provided in an embodiment of the present application. As shown in FIG. 6, the device includes an identifying module 61 and a presenting module 62.

The identifying module 61 is configured to perform fault identification on a component in the wind power generator set.

The presenting module 62 is configured to present an indentified fault using a three-dimensional model of the component.

Figure 7:
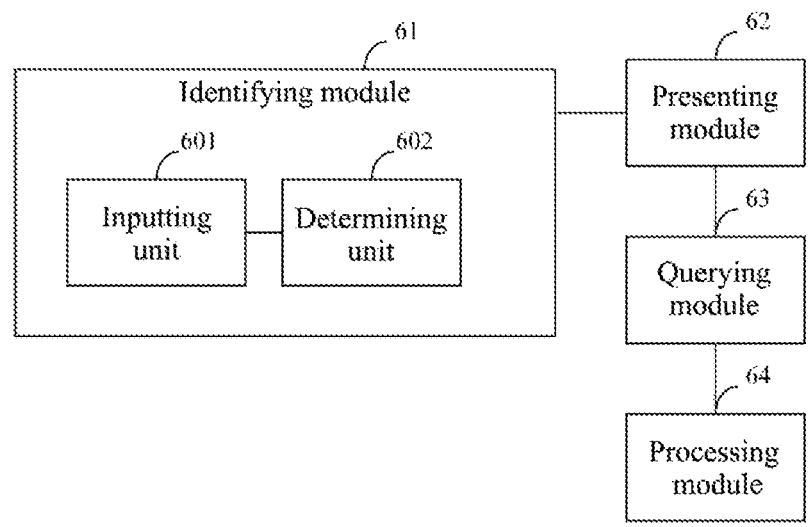
FIG. 7 is a schematic structural diagram of another device for monitoring a fault of a wind power generator set provided in an embodiment of the present application.

FIG. 7 is a schematic structural diagram of another device for monitoring a fault of a wind power generator set provided in an embodiment of the present application. As shown in FIG. 7, on the basis of FIG. 6, the identifying module 61 includes an inputting unit 601 and a determining unit 602.

The inputting unit 601 is configured to input a set of sensor data of the component collected by sensors into a state function corresponding to a respective state mode to obtain a respective judgment value.

The determining unit 602 is configured to determine a most matching state mode from various state modes according to the judgment values of the respective state modes. If the matching state mode is a normal state mode, then there is no fault in the component. Otherwise, the matching state mode is determined as a target fault mode of the component.

Further, the device for monitoring the fault of the wind power generator set further includes a querying module 63 and a processing module 64.

The querying module 63 is configured to query in a solution database to obtain a solution corresponding to the target fault mode of the component.

The processing module 64 is configured to process the fault of the component according to the solution, and/or output the solution.

In some embodiments, after performing the fault identification on the component in the wind power generator set, with respect to the identified fault, the fault is presented using the three-dimensional model of the component, so that the fault monitor might intuitively observe the fault existed in the component, which not only is beneficial for taking effective fault processing measures before a minor fault evolves into a serious fault and thus reduces the harm of the fault, but also reduces the experience requirements for the fault monitor and avoids the process that the fault monitor in the prior art analyzes the two-dimensional curve to identify whether there is a fault in the component according to his experience.

Figure 8:
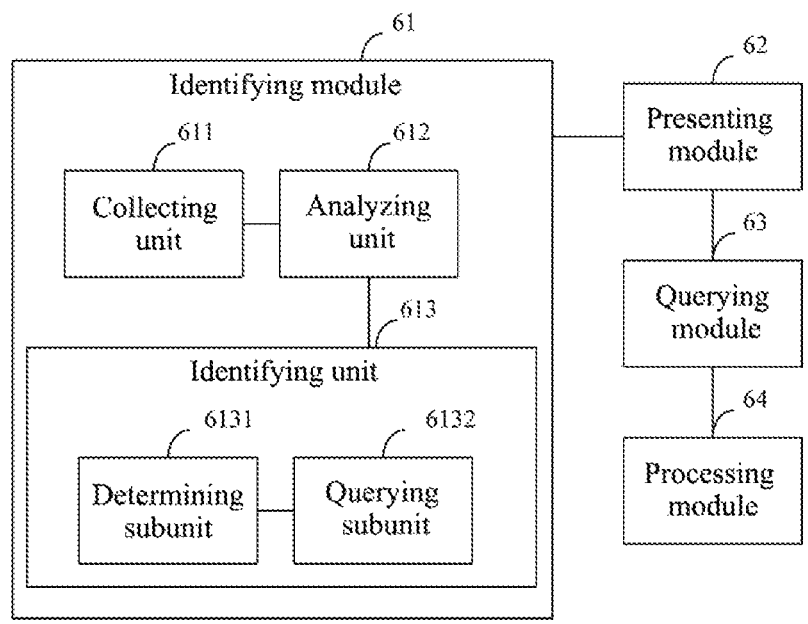
FIG. 8 is a schematic structural diagram of another device for monitoring a fault of a wind power generator set provided in an embodiment of the present application.

FIG. 8 is a schematic structural diagram of another device for monitoring a fault of a wind power generator set provided in an embodiment of the present application. As shown in FIG. 8, on the basis of FIG. 6, the identifying module 61 includes a collecting unit 611, an analyzing unit 612, and an identifying unit 613.

The collecting unit 611 is configured to collect the set of sensor data of the component using sensors.

In some embodiments, the collecting unit 611 is specifically configured to collect values of vibration, sound, temperature and/or image parameters of the component using sensors and to take the values of the vibration, sound, temperature and/or image parameters as the set of sensor data.

The analyzing unit 612 is configured to perform data analysis on the set of sensor data using a pre-trained machine learning model to obtain a characteristic testing matrix.

In some embodiments, the analyzing unit 612 is configured to perform principal component analysis, association analysis, and/or clustering analysis on the set of sensor data using a pre-trained BP neural network to obtain the characteristic testing matrix.

Wherein, a row vector of the characteristic testing matrix is used to indicate the component, and a column vector thereof is used to indicate physical parameters.

For example, the physical parameters include but are not limited to: rotation shaft torque T, inherent frequency H, frictional force $F_f$, reflective light intensity U, power W transmitted by a shaft, output power P, rotational speed N, pressure $F_p$, wind speed V, an impeller diameter D, mass M of the component and/or a pixel O. Where the rotation shaft torque T, the frictional force $F_f$ and the pressure $F_p$ belong to mechanical parameters.

The identifying unit 613 is configured to perform the fault identification according to the characteristic testing matrix.

Further, the identifying unit 613 includes a determining subunit 6131 and a querying subunit 6132.

The determining subunit 6131 is configured to determine the component as operating normally if values of the physical parameters of the component in the characteristic testing matrix match with values of physical parameters in a design state; otherwise, it is identified that there is a fault in the component.

The querying subunit 6132 is configured to query, in a fault database, a target fault mode that matches with the values of the physical parameters of the component in the characteristic testing matrix.

Further, the device for monitoring the fault of the wind power generator set further includes a querying module 63 and a processing module 64.

The querying module 63 is configured to query in a solution database to obtain a solution corresponding to the target fault mode of the component.

The processing module 64 is configured to process the fault of the component according to the solution, and/or output the solution.

After performing the fault identification to the component in the wind power generator set using the identifying module 61, with respect to the fault identified by the identifying module 61, the presenting module 62 presents the fault using the three-dimensional model of the component, so that the fault monitor can intuitively observe the fault existed in the component, which not only is beneficial for taking effective fault processing measures before a minor fault evolves into a serious fault and thus reduces the harm of the fault, but also reduces the experience requirements for the fault monitor and avoids the process that the fault monitor in the prior art analyzes the two-dimensional curve to identify whether there is a fault in the component according to his experience. In addition, the processing module 64 processes the fault of the component according to the solution that corresponds to the fault and is found through querying by the querying module 63 and/or outputs the solution, which enables the wind power generator set to automatically process the fault, reduces the workload of the fault monitor, and improves the efficiency of the fault processing.

Figure 9:
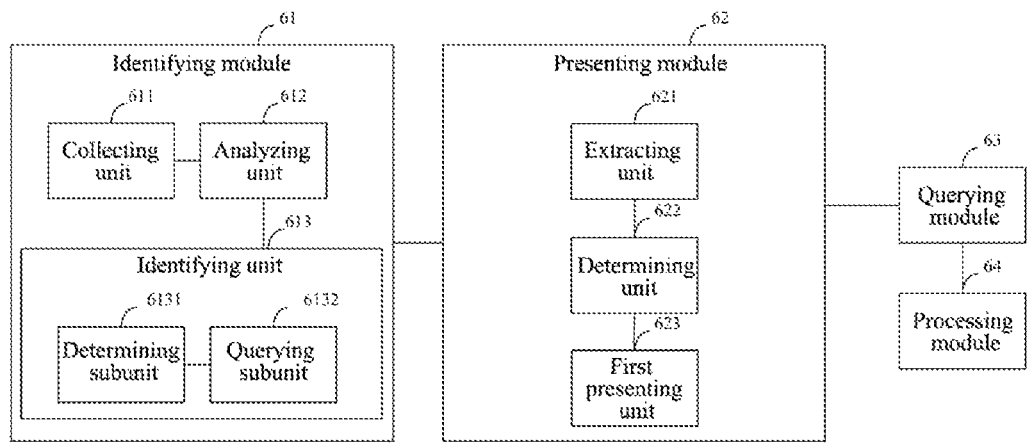
FIG. 9 is a schematic structural diagram of another device for monitoring a fault of a wind power generator set provided in an embodiment of the present application.

FIG. 9 is a schematic structural diagram of another device for monitoring a fault of a wind power generator set provided in an embodiment of the present application. As shown in FIG. 9, on the basis of FIG. 8, the presenting module 62 further includes an extracting unit 621, a determining unit 622 and a first presenting unit 623.

The extracting unit 621 is configured to extract, for the identified component with the fault, a mechanical parameter from the physical parameters of the component with the fault.

The determining unit 622 is configured to determine a value of the mechanical parameter of the component with the fault according to the characteristic testing matrix.

The first presenting unit 623 is configured to take the value of the mechanical parameter as a boundary condition, and perform stress analysis on a normal-state three-dimensional model of the component with the fault, which represents a normal state of the component, to obtain a three-dimensional model presenting a stress state.

Figure 10:
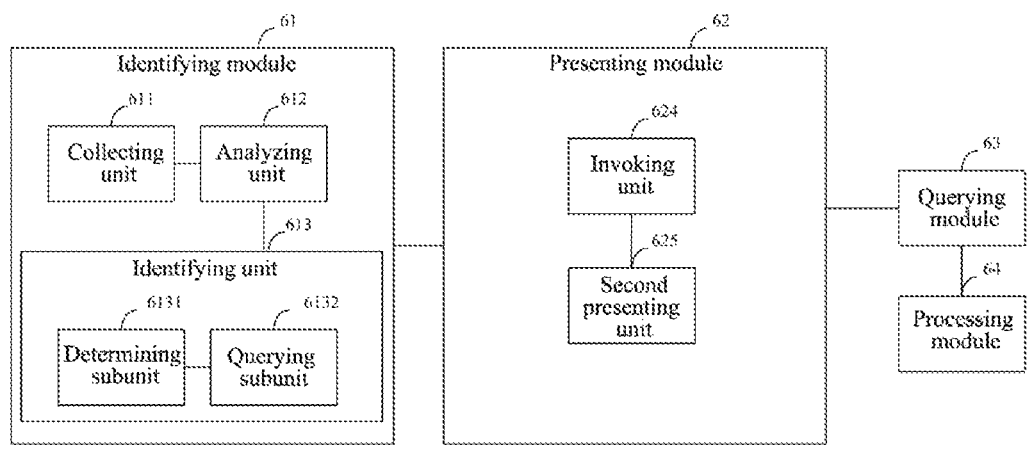
FIG. 10 is schematic structural diagram of another device for monitoring a fault of a wind power generator set provided in an embodiment of the present application.

FIG. 10 is a schematic structural diagram of another device for monitoring a fault of a wind power generator set provided in an embodiment of the present application. As shown in FIG. 10, on the basis of FIG. 8, the presenting module 62 further includes an invoking unit 624 and a second presenting unit 625.

The invoking unit 624 is configured to invoke a target three-dimensional model corresponding to the target fault mode from a pool of the three-dimensional model of the component;

The second presenting unit 625 is configured to present the target three-dimensional model.

In some embodiments, after performing the fault identification on the component in the wind power generator set, with respect to the identified fault, the fault is presented using the three-dimensional model of the component, so that the fault monitor might intuitively observe the fault existed in the component, which not only is beneficial for taking effective fault processing measures before a minor fault evolves into a serious fault and thus reduces the harm of the fault, but also reduces the experience requirements for the fault monitor and avoids the process that the fault monitor in the prior art analyzes the two-dimensional curve to identify whether there is a fault in the component according to his experience.

An embodiment of the present application also provides a computer storage medium and/or a computer program product, a computer program is stored in the computer storage medium, the computer program product includes a computer program that is stored on the computer readable storage medium, and the computer program causes a computer to perform the above-mentioned method for monitoring the fault of the wind power generator set.

It will be understood by those skilled in the art that all or a portion of the steps for implementing the various method embodiments mentioned above may be accomplished by a hardware associated with a program instruction. The aforementioned program may be stored in a computer-readable storage medium. When the program is executed, steps in the method embodiments mentioned above may be executed; and the storage medium includes: a ROM, a RAM, a magnetic disk, or an optical disk, or the like, each of which is a medium capable of storing a program code.

Finally, it should be noted that the above embodiments are merely used to illustrate the technical solutions of the present application and are not intended to limit them. While the present application has been described in detail with reference to the foregoing embodiments, those skilled in the art will understand that modifications can still be made to the technical solutions recited in the foregoing embodiments, or equivalent substitutions can be made to some or all of the technical features therein. However, these modifications or substitutions do not depart the corresponding technical solutions from the scope of technical solutions of the embodiments of the present invention.

What is claimed is:

1. A method for monitoring a fault of a wind power generator set, comprising:
   performing fault identification on a component in the wind power generator set; and
   presenting an identified fault using a three-dimensional model of the component;
   wherein the presenting the identified fault using the three-dimensional model of the component comprises:
   inputting a set of sensor data of the component collected by a sensor into state functions corresponding to respective state modes to obtain respective judgment values; and
   determining a most matching state mode from the respective state modes according to the judgment values of the respective state functions;
   if the most matching state mode is a normal state mode, determining that there is no fault in the component, otherwise, determining the most matching state mode as a fault mode of the component;
   judging a target fault mode of the component according to value ranges of physical parameters of the component in a characteristic testing matrix under each fault mode;
   identifying a target three-dimensional model corresponding to the target fault mode and the value ranges of the physical parameters from a pool of the three-dimensional model of the component; and
   presenting the target three-dimensional model.

2. The method for monitoring the fault of the wind power generator set according to claim 1, wherein the performing the fault identification on the component in the wind power generator set comprises:
   collecting a set of sensor data of the component using a sensor;
   performing data analysis on the set of sensor data using a pre-trained machine learning model to obtain a characteristic testing matrix; a row vector of the characteristic testing matrix is used to indicate the component, and a column vector thereof is used to indicate a physical parameter; and
   performing the fault identification according to the characteristic testing matrix.

3. The method for monitoring the fault of the wind power generator set according to claim 2, wherein the presenting the identified fault using the three-dimensional model of the component comprises:
   extracting, for the identified component with the fault, a mechanical parameter from the physical parameter of the component with the fault;
   determining a value of the mechanical parameter of the component with the fault according to the characteristic testing matrix; and
   taking the value of the mechanical parameter as a boundary condition, and performing stress analysis on a normal-state three-dimensional model of the component with the fault to obtain a three-dimensional model presenting a stress state.

4. The method for monitoring the fault of the wind power generator set according to claim 2, wherein the performing the fault identification according to the characteristic testing matrix comprises:

determining the component as operating normally if a value of the physical parameter of the component in the characteristic testing matrix matches with a value of the physical parameter in a design state;

otherwise, identifying that there is a fault in the component; and querying, in a fault database, a target fault mode that matches with the value of the physical parameter of the component in the characteristic testing matrix.

5. The method for monitoring the fault of the wind power generator set according to claim 2, wherein the physical parameter comprises: rotation shaft torque T, inherent frequency H, frictional force Ff, reflective light intensity U, power W transmitted by a shaft, output power P, rotational speed N, pressure Fp, wind speed V, an impeller diameter D, mass M of the component and/or a pixel O;

wherein the rotation shaft torque T, the frictional force Ff and the pressure Fp belong to the mechanical parameter.

6. The method for monitoring the fault of the wind power generator set according to claim 1, wherein after presenting the identified fault using the three-dimensional model of the component, the method further comprises:

querying in a solution database to obtain a solution corresponding to the target fault mode of the component; and processing the fault of the component according to the solution, and/or outputting the solution.

7. A computer non-transitory storage medium, wherein a computer program is stored on the non-transitory computer storage medium, and the computer program causes a computer to perform the method for monitoring the fault of the wind power generator set according to claim 1.

* * * * *